United States Patent
McNeilly et al.

(10) Patent No.: US 9,207,133 B2
(45) Date of Patent: Dec. 8, 2015

(54) MASS SENSING PLATFORM

(75) Inventors: Mike McNeilly, Gilbert, AZ (US);
James Richardson, Mesa, AZ (US);
Don Way, Scottsdale, AZ (US)

(73) Assignee: Cleveland Electric Laboratories Co., Twinsburg, OH (US)

( * ) Notice: Subject to any disclaimer, the term of this patent is extended or adjusted under 35 U.S.C. 154(b) by 1013 days.

(21) Appl. No.: 13/284,845

(22) Filed: Oct. 28, 2011

(65) Prior Publication Data

US 2012/0169455 A1 Jul. 5, 2012

Related U.S. Application Data

(60) Provisional application No. 61/407,746, filed on Oct. 28, 2010.

(51) Int. Cl.
*G05B 19/02* (2006.01)
*G01L 5/10* (2006.01)

(52) U.S. Cl.
CPC ...................... *G01L 5/105* (2013.01)

(58) Field of Classification Search
CPC ......... G01L 5/105; G01L 5/106; G01L 5/107; G01L 5/108; G08B 21/22
USPC .................................................. 340/4.34, 668
See application file for complete search history.

(56) References Cited

U.S. PATENT DOCUMENTS

| | | | |
|---|---|---|---|
| 7,331,071 B1 * | 2/2008 | Cherubini et al. | 5/83.1 |
| 7,380,375 B2 | 6/2008 | Maly | |
| 2002/0041794 A1 * | 4/2002 | Bostelman et al. | 405/4 |
| 2005/0226584 A1 * | 10/2005 | Williams et al. | 385/130 |
| 2006/0082465 A1 * | 4/2006 | Grzan et al. | 340/665 |

* cited by examiner

*Primary Examiner* — Nabil Syed
(74) *Attorney, Agent, or Firm* — Roger D. Emerson; Emerson Thomson Bennett

(57) ABSTRACT

An apparatus is disclosed comprising a platform operable to support a human. The apparatus also includes at least one cable suspending the platform. The apparatus also includes an elongation sensor engaged with the at least one cable. The elongation sensor is operable to emit a signal in response to elongation of the at least one cable. A method of using the apparatus is also disclosed. The method includes the step of positioning the platform adjacent to one of a machine and a path along which the machine moves. The method also includes the step of detecting a mass on the platform by emitting the signal from the elongation sensor in response to elongation of the at least one cable. The method also includes the step of disengaging the machine in response to the detecting step.

14 Claims, 3 Drawing Sheets

MASS SENSING PLATFORM

CROSS-REFERENCE TO RELATED APPLICATIONS

This application claims the benefit of U.S. Provisional Patent Application Ser. No. 61/407,746 for a MASS SENSING PLATFORM, filed on Oct. 28, 2010, which is hereby incorporated by reference in its entirety.

BACKGROUND OF THE INVENTION

1. Field of the Invention

This invention relates generally to methods and apparatus used to detect of an object, item or person on a platform or elevated walkway.

2. Description of Related Prior Art

U.S. Pat. No. 7,380,375 discloses an alarm system for a loading dock. The alarm or safety system for a truck doorway such as a loading dock with an elevated platform provides an alarm that warns of a falling hazard that may exist due to the dock door being open while a truck is not present at the dock. In cases where a dock's open doorway is protected by a barrier that can be opened or closed, the alarm can be deactivated by closing the barrier. In some embodiments, the safety system includes a remote body sensor that detects when someone or something is near the doorway. In response to the body sensor, a second, more pronounced alarm can warn of more imminent danger where someone on the platform may be too close to an open doorway when a truck is not present.

SUMMARY OF THE INVENTION

In summary, the invention is an apparatus comprising a platform operable to support a human. The apparatus also includes at least one cable suspending the platform. The apparatus also includes an elongation sensor engaged with the at least one cable. The elongation sensor is operable to emit a signal in response to elongation of the at least one cable. A method of using the apparatus is also disclosed. The method includes the step of positioning the platform adjacent to one of a machine and a path along which the machine moves. The method also includes the step of detecting a mass on the platform by emitting the signal from the elongation sensor in response to elongation of the at least one cable. The method also includes the step of disengaging the machine in response to the detecting step.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF AN EXEMPLARY EMBODIMENT

Figure 2:
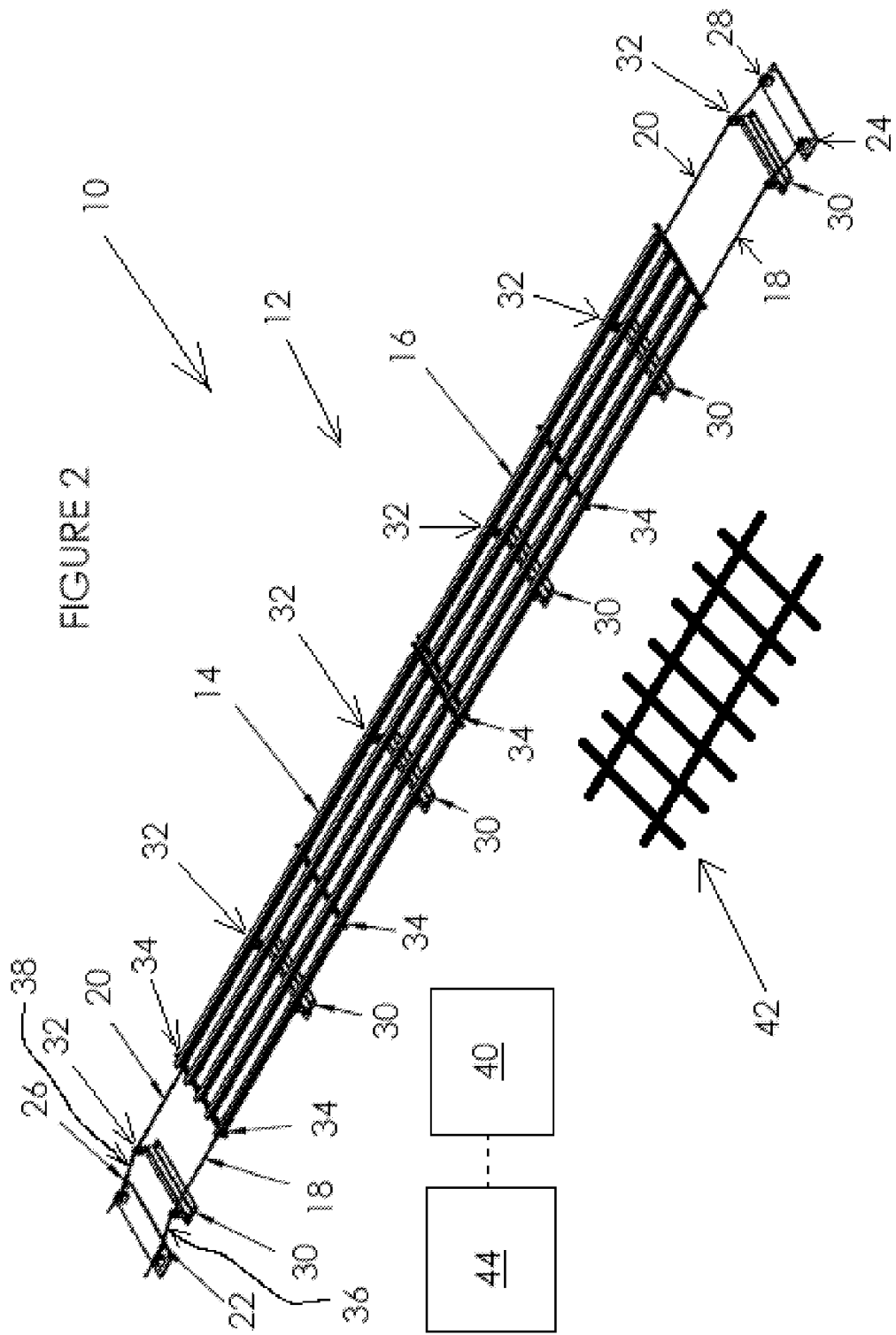
FIG. 2 is a perspective view of an exemplary embodiment of the invention.
Figure 3:
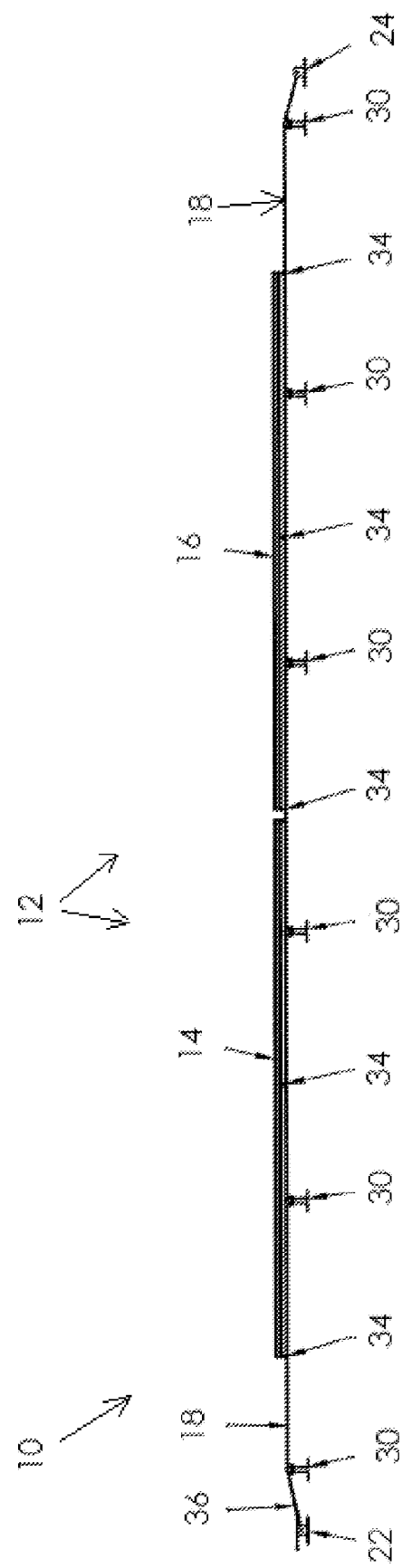
FIG. 3 is a front view of the exemplary embodiment shown in FIG. 2.

The invention, as demonstrated by the exemplary embodiment described below, provides an apparatus for enhancing the safety of humans around machinery. FIGS. 2 and 3 show an apparatus 10 according to an embodiment of the invention. The apparatus 10 includes a platform 12 operable to support a human. In the exemplary embodiment, the platform 12 includes sections 14 and 16. The platform 12 can define a continuous surface for supporting a human or can be discontinuous, as shown in the exemplary embodiment.

The apparatus 10 also includes first and second cables 18, 20 suspending the platform 12. The first cable 18 is fixedly mounted to first and second anchors 22, 24. The second cable 20 is fixedly mounted to third and fourth anchors 26, 28. The anchors 22, 24, 26, 28 can be substantially similar to one another. In the exemplary embodiment, the anchors 22 and 26 are integral with each other and the anchors 24 and 28 are integral with each other.

A first plurality of vertical supports 30 are disposed between the first and second anchors 22, 24, and the support the first cable 18. The first cable 18 extends over the first plurality of vertical supports 30. A second plurality of vertical supports 32 are disposed between the third and fourth anchors 22, 24, and the support the second cable 20. The second cable 20 extends over the second plurality of vertical supports 32. In the exemplary embodiment, each vertical support 30 is paired and integral with a vertical support 32.

Figure 1:
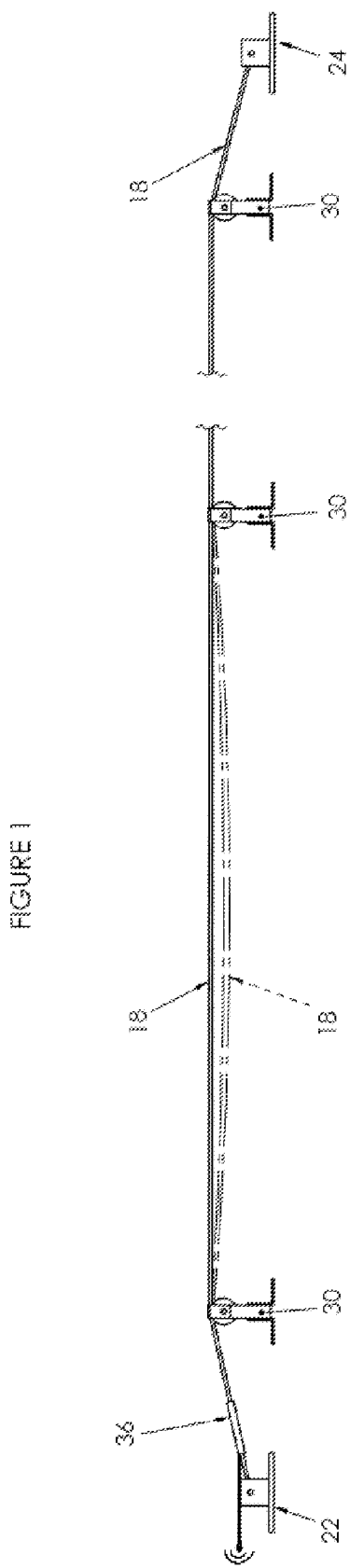
FIG. 1 is a side view of a portion of an exemplary embodiment of the invention.

The platform 12 can be supported on the first and second cables 18, 20 at positions between respective adjacent vertical supports 30, 32. The loading points of the platform 12 on the cables 18, 20 are referenced at 34. In response to a mass being supported on the platform 12, such as a human standing on the platform 12, the cables 18, 20 elongate, as shown in phantom for cable 18 in FIG. 1.

The apparatus 10 also includes first and second elongation sensors 36, 38. The first sensor 36 is engaged with the first cable 18 and is operable to emit a signal in response to elongation of the first cable 18. The second sensor 38 is engaged with the second cable 20 and is operable to emit a signal in response to elongation of the second cable 20. The elongation sensors can be any form of transducer operable to convert change in length to an electric signal, such as a fiber optic load cell or a strain gauge. In the exemplary embodiment, the elongation sensor 36 is directly adjacent to the first anchor 22 and also to one of the plurality of vertical supports 30 along the first cable 18. The sensors can be positioned at other locations in embodiments of the invention.

Embodiments of the invention can enhance the safety of humans around machinery. An embodiment of the invention can be placed adjacent to a machine or adjacent to a path along which the machine moves. For example, as shown schematically in FIG. 2, the apparatus 10 can be positioned adjacent to a manufacturing machine 40. A manufacturing machine 40 can be a lathe, a press, a grinding machine, or a mold, for example. A manufacturing machine can be a device that intermittently defines spaces or gaps large enough to receive a human limb or digit. A manufacturing machine can be a device with moving part(s) that result in the envelope of the machine changing; a proximate human could be struck by the moving part(s). In these examples, a manufacturing machine can be a device that can be dangerous to humans.

Embodiments of the invention can also be arranged such that the platform is positioned adjacent to a path along which the machine moves. The path can be defined on private property, such as a factory. The path can be defined on public property. In an embodiment of the invention, the platform 12 can be positioned adjacent to a railway/railroad tracks 42, shown schematically in FIG. 2.

In operation of the exemplary embodiment, a mass on the platform 12 can be detected by elongation of one or both of the cables 18, 20. This elongation is sensed by one or both of the sensors 36, 38. If both sensors 36, 38 detect elongation, respective signals are emitted. One or both of the sensors 36, 38 can communicate signals wirelessly or through a hard-wire connection. The signal can be received by a microprocessor controller 44 of the machine 40; the microprocessor controller 44 can disengage the machine in response to receiving the signal. Thus, the detecting of elongation can ultimately result in disengagement of the machine.

Another embodiment of the invention can be positioned adjacent to a path of movement of a machine, such as a locomotive. If a mass is detected on the platform 12, a signal emitted by an elongation sensor 36 and/or 38 can be received by an operator of the locomotive, such as in the form of an audio or visual warning. The locomotive operator can be trained to respond to the warning by disengaging the locomotive, such as by braking or by allowing velocity to diminish without active braking.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. An apparatus comprising:
   a platform operable to support a human;
   at least one cable suspending said platform;
   an elongation sensor engaged with said at least one cable and operable to emit a signal in response to elongation of said at least one cable;
   first and second anchors;
   a plurality of vertical supports disposed between said first and second anchors, wherein said at least one cable is fixedly mounted to each of said first and second anchors and extends over said plurality of vertical supports, and wherein said platform is supported on said at least one cable at positions between adjacent vertical supports; and,
   a microprocessor controller operable to disengage an associated machine upon receipt of said signal in response to elongation of said at least one cable.

2. The apparatus of claim 1 wherein said elongation sensor is further defined as a fiber optic load cell.

3. The apparatus of claim 1 wherein said elongation sensor is further defined as a strain gauge.

4. The apparatus of claim 1 wherein said elongation sensor is directly adjacent to one of said first and second anchors and also to one of said plurality of vertical supports along said at least one cable.

5. An apparatus comprising:
   a platform operable to support a human;
   first and second cables suspending said platform;
   first and second elongation sensors each engaged with one of said first and second cables and operable to emit a signal in response to elongation of said respective cable;
   a microprocessor controller operable to disengage an associated machine upon receipt of said signal in response to elongation of either or both of said first cable or said second cable;
   first and second anchors wherein said first cable is fixedly mounted to each of said first and second anchors;
   third and fourth anchors wherein said second cable is fixedly mounted to each of said third and fourth anchors;
   a first plurality of vertical supports disposed between said first and second anchors, wherein said first cable extends over said first plurality of vertical supports; and
   a second plurality of vertical supports disposed between said third and fourth anchors, wherein said second cable extends over said second plurality of vertical supports, wherein said platform is supported on said first and second cables at positions between respective adjacent vertical supports.

6. A method for detecting the presence of a person on a platform comprising the steps of:
   providing an apparatus comprising:
   a platform operable to support a human;
   at least one cable suspending said platform;
   an elongation sensor engaged with said at least one cable and operable to emit a signal in response to elongation of said at least one cable;
   first and second anchors;
   a plurality of vertical supports disposed between said first and second anchors, wherein said at least one cable is fixedly mounted to each of said first and second anchors and extends over said plurality of vertical supports; and wherein said platform is supported on said at least one cable at positions between adjacent vertical supports; and,
   a microprocessor controller operable to disengage an associated machine upon receipt of said signal in response to elongation of said at least one cable;
   positioning said apparatus adjacent to one or both of the machine and a path along which the machine moves;
   detecting a mass on said platform by emitting the signal from said elongation sensor in response to elongation of said at least one cable; and
   disengaging the machine in response to said detecting step.

7. The method of claim 6 wherein said positioning step is further defined as:
   positioning said platform adjacent to a manufacturing machine;
   wherein said manufacturing machine is one of a lathe, a press, a grinding machine, a mold, a machine that intermittently defines spaces or gaps large enough to receive a human limb or digit, a machine with moving parts that results in the envelope of the machine changing, and a machine wherein a human could be struck by a moving component.

8. The method of claim 6 wherein said positioning step is further defined as:
   positioning said platform adjacent to railroad tracks.

9. The apparatus of claim 1 wherein said signal in response to elongation is transmitted.

10. The apparatus of claim 9 wherein said microprocessor controller further comprises a wireless receiver.

11. The apparatus of claim 5 wherein said signal in response to elongation is transmitted wirelessly.

12. The apparatus of claim 11 wherein said microprocessor controller further comprises a wireless receiver.

13. The method of claim 6 wherein said signal in response to elongation is transmitted wirelessly.

14. The method of claim 13 wherein said microprocessor controller further comprises a wireless receiver.

* * * * *